Jan. 1, 1963
G. W. BANKS
3,071,344
LOW TORQUE HIGH PRESSURE FLUID VALVE
Filed Aug. 4, 1958
2 Sheets-Sheet 1
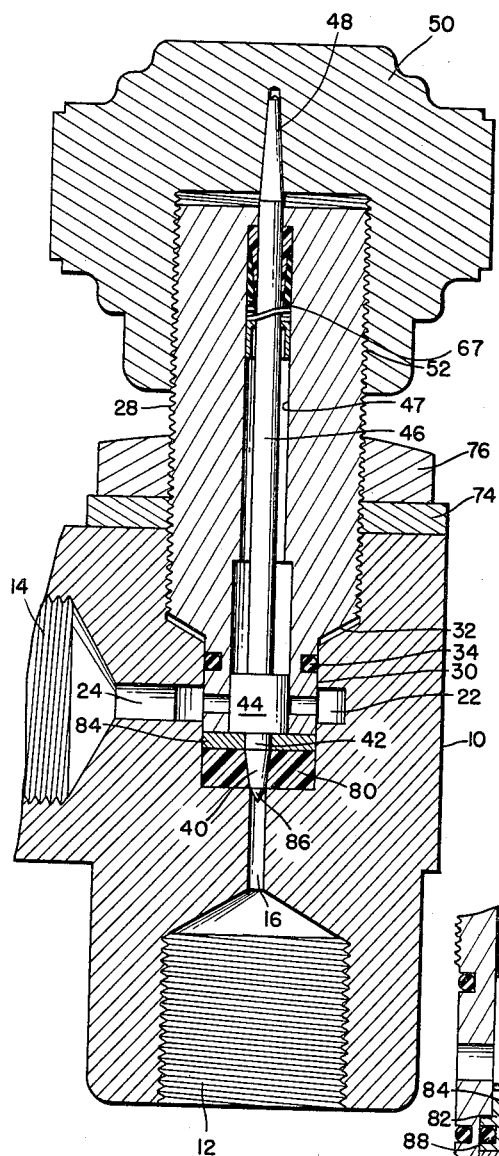
FIG. 1
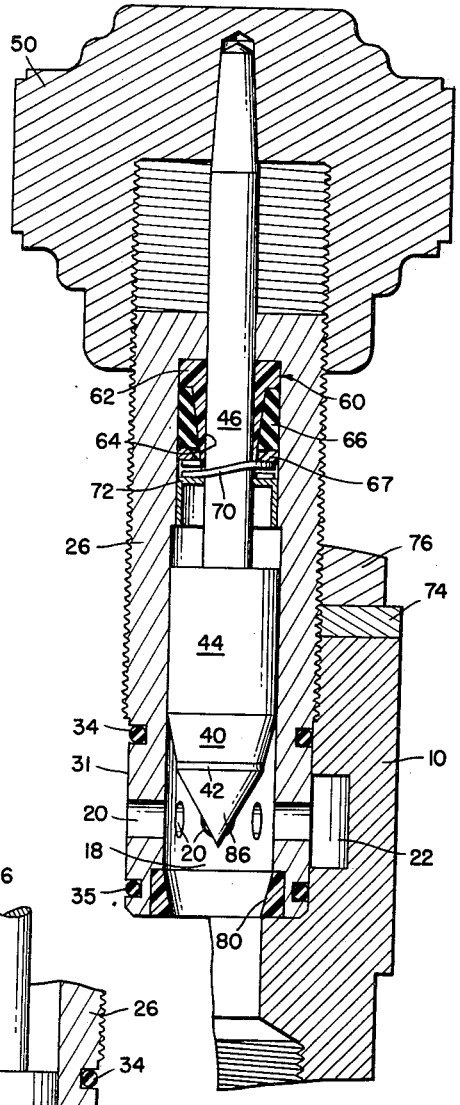
FIG. 2
FIG. 3
INVENTOR.
GEORGE W. BANKS
BY
Smith & Tuck

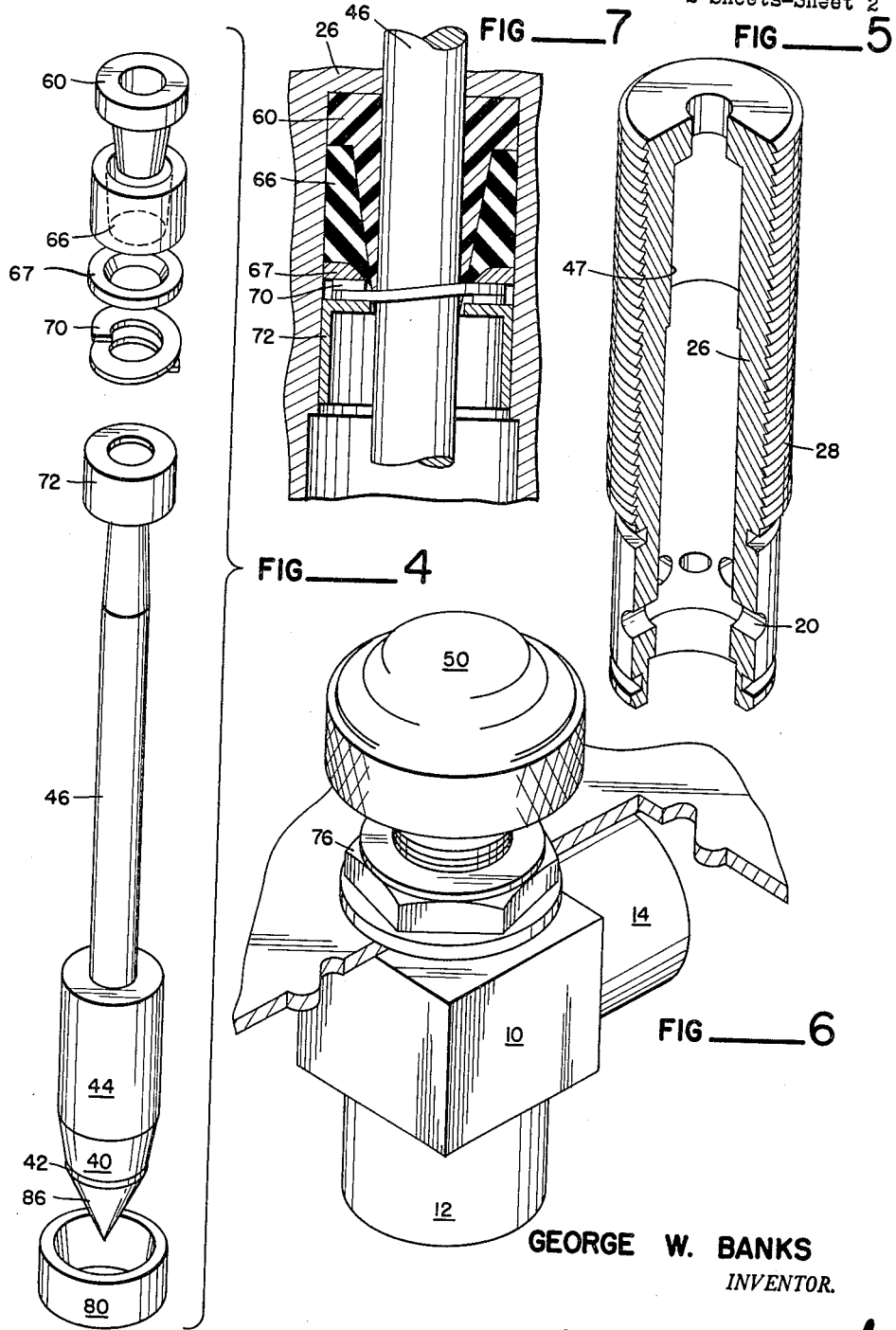

United States Patent Office 3,071,344
Patented Jan. 1, 1963

3,071,344
LOW TORQUE HIGH PRESSURE FLUID VALVE
George W. Banks, 12424 14th S., Seattle, Wash.
Filed Aug. 4, 1958, Ser. No. 752,805
6 Claims. (Cl. 251—210)

This present invention relates to the general classification of valves intended to control the flow of fluids under high static pressures. More particular, this invention relates to a simplified valve construction in which the plastic valve seat used is fully enclosed in steel during the time it is under extremes of pressure so that the seat material can only be compressed. It cannot be distorted by flowing as might occur if it were not entirely enclosed in suitable metal.

Accelerated studies in jet and rocket propulsion particularly have opened up a need for high pressure valves for use in controlling fluid pressures in the range of up to 15,000 pounds per square inch and possibly higher. Valves of this order are required in the actual propulsion motors themselves and in their fuel and oxidizing agent control lines and they are increasingly more necessary in control laboratories where these various propulsion fuel components are tested, evaluated and proportioned for use. In the past the need for high pressure valves was in the range of levels of up to 3500 p.s.i. but, as advances are made, these pressures have been increasingly raised in order to gain higher efficiency until they have now reached the level formely only approached by high intensity cartridges in rifles and the like. As the pressure range has been increased it has become increasingly more difficult to, on the one hand provide a valve that would make a complete shut-off, and on the other hand give a metering control during the periods of low volume flow and then control the full flow without the valves themselves soon losing this ability through failure of component parts. Another problem has been the necessity for sealing the valves against leakage where the various parts are joined together and particularly along the stem of the valves. Many sealing arrangements will function at certain stages of the operation but it is necessary in a valve of this order that the valve function throughout its full range and be capable of precise handling with very low torques applied to the operating knob and from this member to the valve operating stem itself. In this present valve, it is believed, that these perplexing problems have been solved.

The principal object of this present invention, therefore, is to provide a high pressure low torque valve with characterized flow control.

A further object of this invention is to provide a new low torque, high pressure moving seal assembly using plastic material such as polytetrafluoroethylene as sealing material at the shut-off point of the valve and on the stem of a valve.

A further object of this invention is to provide a high pressure valve that is easily operated and which requires no lubrication, thus making it an ideal valve arrangement for the control of oxygen and the like.

A further object of this invention is to make use of the cold flow of certain of the plastic materials by confining it so completely, with suitable high tensile strength metals, that its flow under pressure will be completely under control.

A further object of this invention is to control the expansion and contraction of the plastic material used by providing means for compensating for temperature changes of the same.

A further object of this invention is to provide compensating means so that wear incidental to use will be taken care of automatically and the proper tension maintained on the seals at all times.

Further objects, advantages and capabilities will be apparent from the description and disclosure in the drawings, or may be comprehended or are inherent in the device.

In the drawings:

FIGURE 1 is a vertical sectional view through a metering valve, without seat ejector, made after the teachings of this present invention, the same being shown in its closed position.

FIGURE 2 is a view of a valve similar to that shown in FIGURE 1 with the valve shown in its open position and with certain parts modified to facilitate interchangeability of some of the functional parts and incorporating a plastic seat ejector.

FIGURE 3 is the lower portion of the valve seating means showing a further modification in form, particularly adaptable to small metering pins, and to facilitate interchangeability of parts in standardized valve assemblies for different flow capacities.

FIGURE 4 is a bracketed, exploded view showing in perspective the various parts as used in the form of valve shown in FIGURE 2.

FIGURE 5 illustrates the valve barrel, the same being partially broken away and sectioned to better illustrate the structure.

FIGURE 6 is a perspective view showing one arrangement for panel mounting my high pressure valve for use.

FIGURE 7 is a fragmentary view, on enlarged scale, showing the valve stem sealing members of FIGURES 1 and 2.

Referring to the drawings throughout which like reference numerals indicate like parts, 10 designates the body or main housing of my valve. It is to be noted that throughout the various figures I have illustrated an angle type valve but it is believed that it will be apparent that the various types of standard valve forms might similarly be employed. Body 10 is interiorly threaded at 12 to accept preferably the intake pipe and at 14 the body is threaded to receive the discharge pipe. It should be noted that the flow of fluids through the valve may be in either direction. However, it is normally desirable to have the flow in the direction that will reduce the possibility of leakage where the various seals occur and this condition occurs when the circulation is initialed at 12 through the valve and out the threaded opening 14. The intake pipe, which is not shown, feeds fluid to the valve which is conducted through intake passageway 16 and which normally, when the valve is opened as in FIGURE 2, will lead the fluid through the valve chamber 18 out through the various characterization ports 20 into the annular distributing ring chamber 22 and out the passageway 24 into the discharge tube secured in the threaded opening 14.

Adapted to be secured in body 10 is the valve stem enclosing barrel 26 which is provided with threads 28 on a generous diameter so that they will have ample strength to resist the very high pressures for which these valves are designed. Body 10 has coacting threads and these should be of adequate length to insure the necessary strength required. The end of valve barrel 26 that is entered into body 10 is provided with a cylindrical portion, preferably on a reduced diameter, as indicated in FIGURE 1 at 30. If valve barrel 26 is not to be employed as a convertible barrel adapted to several orifice sizes then it is best to follow the form of FIGURE 1 in which a beveled valve seat is provided at 32 and a central sealing "O" ring at 34. If the larger elements of the valve assembly are to be used for a range of sizes, then the form illustrated in FIGURES 2 and 3 is best employed. Here a cylindrical portion as 31 is provided and a lower sealing "O" ring 35 is employed.

The various forms of my valve all employ a similar valve stem, although the lower portion may be modified. The stem provides the metering point 40 which is tapered to more effectively provide for minute metering of small quantities of high pressure fluids. Above the tapered portion is a cylindrical portion 42 of the same size as the major diameter of the tapered portion 40. In the maximum capacity size for a given barrel, as shown in FIGURE 2, the position of portion 42 is reversed as shown. Above the metering point 40, as viewed through the various drawings, a full flow controlling piston valve portion 44 is provided. Above portion 44 the valve stem carries a uniform and reduced diameter valve stem or spindle 46 which is disposed coaxially with barrel 26 which is bored out on a diameter considerably larger than valve stem 46 so that sealing means can be provided for the stem. At its extreme upper end as viewed, valve stem 46 is provided, preferably, with a tapered portion 48 employing a locking taper on the order of approximately one and a half degrees per side or one quarter of an inch per foot. This has been found to be a very satisfactory connection for the operating knob 50. Knob 50 is preferably provided with an interior thread at 52 which engages the exterior threads 28 of barrel 26. This threading arrangement, being of relatively large diameter, in addition to providing great strength against impact, gives a very low pitched angle and thus provides an excellent mechanical advantage and the whole arrangement provides, in effect, a secondary seal for any possible leakage occurring along the valve stem.

Disposed at the upper end of bore 47 is the means employed for sealing the valve stem against leakage. This construction is probably best illustrated in FIGURE 2 and FIGURE 7 where the scale is enlarged and in FIGURE 4 where the parts are disposed in exploded relationship. Concentrically disposed on stem 46 is a plastic sealing member or sleeve indicated generally by the reference character 60. This member is provided with a seating flange portion 62 and a relatively long tapered sealing portion 64 which entirely encircles stem 46 and runs out to a fine edge at its lower portion as viewed in the various figures of the drawings. Disposed to coact with the tapering skirt 64 and to press it evenly around the periphery of stem 46 into intimate contact with the stem, is a rubber bushing 66. This bushing has an interior tapered bore matching the skirt 64 of the plastic member 60 and should be made from a live resilient rubber. A preferred form of rubber is the live silicon rubber. This can accept high pressures for long periods without losing its ability to recover its original form. One suitable plastic for member 60 is of the type known as polytetrafluoroethylene. Adapted to bear on the lower end of the bushing 62 but on a diameter permitting the feathered-out edge of skirt 64 to pass therethrough, is a spiral spring 70. The purpose of this spring is to maintain sufficient pressure on the rubber bushing 66 to assure that the skirting 64 of seating member 60 will be pressed slightly against the stem 46 entirely around the same. Spring 70 is held in place against its own pressure by a thimble 72 which is formed preferably of resilient steel, and forced so snugly into bore 47 that it provides an abutment against the lower portion of spring 70 and insures its being held in working position against the rubber bushing 66. In the higher pressure ranges a snug fit of the rubber on the plastic can be assured by using a metal washer 71 on top of spring 70 and having the washer counter-bored at approximately 45° to insure the flow of the rubber to stem 46. This structure is best shown in FIGURE 7. In case of leakage of fluid along valve stem 46, however, it is believed, it will be apparent that the fluid pressure would then bear on the lower end of bushing 66 compressing the same throughout its entire length and forcing the skirting of member 60 into tight engagement with stem 46 with a pressure in proportion to the needs required to prevent leakage of the fluid along the valve stem.

Lock nuts as 74 and 76 are employed to insure that valve 26 will not tend to work loose in the threads of body 10.

Referring to the valve shut-off elements it is believed that FIGURES 1, 2 and 3 will show approximately the full operational range required to serve the needs of a valve of this order. All these forms, however, must serve one essential purpose which is to fully enclose the valve seating material at 80. As in the sealing member 60 there may be many different forms of plastic materials that will meet the operational conditions required; however polytetrafluoroethylene has proven very satisfactory in that it is readily available in different tempers so that material can be selected that will be particularly effective for certain definite temperature and pressure ranges.

In dealing with the high pressures encountered in valves of this order it is necessary first of all to effectively seal the fluid passageway when the valve is shut off and when high pressures are involved this requires an unusual material which to be usable over reasonable periods must be fully encased, preferably in steel, for the higher pressures. By steel in this instance it is normally considered stainless steel. When a washer of this type of plastic is entirely enclosed with steel, or for the lower pressures in any non-corrosive metal, a complete seal can be achieved, and by proper shrouding the material is so confined that it cannot flow out along the surfaces it is employed to seal. Further, by employing one full surface of the washer to resist over torquing of the valve a long useful life of the washer can be assured.

There are many forms of valves which use plastic sealing washers or rubber washers, or, in some cases rubber substitutes, and these function very satisfactorily at lower pressures and are very commonly used in ordinary valves, particularly those used in household and the like. The usual construction of the ordinary faucet, however, as distinct from a high pressure valve, does not employ its resilient washer in a manner to protect it against high pressure fluids because this is not contemplated under their conditions of use. Carrying out the principle, however, of fully enclosing the plastic seat member as 80, one part of the enclosure is provided by body 10 in the form shown in FIGURES 1 and 2 and in FIGURE 3 the equivalent is provided in the secondary adapter member 82. Referring to FIGURE 1, it will be observed that the washer is largely seated within the body 10 and then is provided with a first steel washer 84 through which the cylindrical portion 42 of stem 46 passes. The tapered portion of the valve stem as 40 is employed as the metering element for controlling small volume flow and giving the nicety of control that a valve of this order must provide. At its lower end the valve stem is provided with a point portion at 86. In the form shown in FIGURES 1 and 2 the valve barrel 26 seats on the upper face of washer 80 or upon the steel washer 84.

The cylindrical piston valve portion 44 further serves to back up washer 84 under the maximum pressure loadings in the form shown in FIGURE 1. In FIGURE 2 washer 80 is fully enclosed at maximum pressure by valve body 10, the lower portion of barrel 26 and is further completed by the taper portion 40, this form being most suitable for use in the larger orifice valves. The form shown in FIGURE 1 is applicable to the medium and small orifice valve arrangements.

In FIGURE 3 is shown the form of a valve using a barrel that is interchangeable with the barrel shown in FIGURE 2, which is best suited for small orifices where it is desired to employ interchangeability of valve stems and seating means within common bodies 10 and common barrels 26 and this accounts for the seemingly oversize piston portion 44 shown in FIGURE 3. With such an arrangement it is very desirable to employ the adapter member 82 and this calls for a third O ring as 88. Further to insure adequate reinforcement of washer 80 a second steel washer 90 is employed. It will be noted in FIGURE 3 that a reduced diameter cylindrical portion is provided at 92 on the lower portion of 44 in order that washer 84 may be adequately enclosed and reinforced to resist high pressure loadings.

*Operation of Metal Enclosed Cold Flow Plastic Seat*

This new steel clad seat design was particularly developed to allow cold flow plastic seats to be used successfully in valves which are operated at extremely high pressures ranging all the way from zero to 15,000 p.s.i. and higher. Valves equipped with this new seat retain all the superior characteristics of a properly designed plastic seat valve as, positive leakproof shut-off, very good metering, no damage by over-torquing, ease of operation, and long life. Small amounts of abrasive or foreign material will not cause the valve to leak.

This new design improves the valve in several ways. First, it allows the same plastic material to be used successfully at several thousand pounds higher working pressure. The design is such that the force of the high pressure stress on the plastic seat is backed up by steel. This keeps these stresses from distorting the plastic seat and gives the valve greater metering stability. The only movement the high pressure can cause the plastic seat to make is to compress it slightly and cause the plastic to move very slightly toward the taper of the spindle. This happens just as the valve is opening.

A plastic having the proper compressive stress point must be selected for any plastic seat valve to have the valve work properly at the higher working pressures. The different grades of "Teflon," polytetrafluoroethylene, make an excellent seating material for low and medium high pressures, zero to 6,000 p.s.i. "Kel–F," for example, makes an excellent material for seats which have to operate at the higher pressures.

With this new design the action of the spindle working at the higher pressures will actually increase the yield point of the plastic. The valve will continue to operate successfully far above the original yield point of the plastic. This is due to the fact that the plastic seat is held firmly while in operation as in a forming die, formed by the body, barrel, steel back-up ring, and spindle. This forming die action forges the plastic seat, always keeping it in just the proper shape. The nature of the plastic alows it to take a permanent set with a higher yield point than the original, and the valve continues to operate perfectly.

Second, the plastic seat is protected from damaging high velocities by being inlaid in steel. The design of the valve is such that the high damaging velocities are always parallel to the exposed surface of the plastic seat. The high velocities never strike the plastic seat at a damaging angle.

Third, the plastic seat is used only for positive shut-off and minute metering. The flow metering is done between the spindle portion 44 and the characterization ports 20. The only time the plastic is exposed to the full working pressure is in the closed position. In this position there is no wear, and the plastic is completely surrounded and backed up by steel, making an ideal seal.

Fourth, little or no differential pressure across the plastic seat in the flow position. When the valve starts to open, the flow fluickly changes the high differential pressure from across the plastic seat to across the characterization ports. The shape of the spindle is such that the spindle is well away from the plastic before the characterization ports start opening. The high pressure is retained on and all around the plastic seat, but there is no longer any differential pressure across the seat so there is no distorting force on the plastic in the flow position.

Fifth, function of the lower O ring. When a high pressure is applied to the lower port of the valve in the closed position, there is a force which tends to lift the seat assembly. The plastic having a slight resiliency, the lower part will follow the spindle up a slight way. However slight this movement is it will let a leak develop under the seat assembly and out around the bottom of the barrel up and out of the upper port. The lower O ring seals off this leak insuring all the metering is being controlled properly through the characterization ports. This lower O ring 35 greatly reduces the torque necessary for complete shut-off. This is due to the fact that when the lower O ring is employed, the positive shut-off is attained by the spindle contacting the plastic seat 80. Without the lower O ring the spindle would have to contact the plastic seat then force the entire plastic seat down until it seats tightly on its lower flat surface against the body of the valve. Due to the taper shape of the spindle there is a wedging action to overcome as well as the lift caused by the high pressure, and it requires a very high force to move the seat down. This is the cause for the high shut-off torque at high pressures when the lower O ring is not used.

With the larger valves the design shown in FIGURE 2 is used. The seating area of this valve is large enough to keep the stress on the plastic seat well within the working limits of the plastic.

When the valves are small and the metering pins 40 have a very small area as well as a slight angle, the design shown in FIGURE 1 is used. This design protects the plastic seat from over-torquing. The operation of this valve is as follows: on closing, first the flow is shut off by the metering pin entering the steel back up ring 84, then contacting the plastic seat. If the operator continues to turn the control knob, the spindle will contact the steel back-up ring and place the stress of the over-torquing on the flat surface of the entire plastic seat. This area is sufficiently large to absorb any force which may be exerted through the control knob, and still stay well within the working stress limits of the plastic. Over-torquing simply keeps the plastic seat in just the proper shape as it is, as previously noted, in a forming die formed by the body, barrel, steel back-up ring, and the spindle.

FIGURES 2 and 3 illustrate a barrel 26 having the plastic seat ejector. With this type barrel it is necessary to have the lower O ring seal 35 as shown. This lower O ring seal also allows one more feature to be added to the valve. It will enable the manufacturer of the valve to make up several different sized orifice valves with the same standard barrel and body. The only parts necessary to change to make up any orifice size, within the range chosen, is the spindle and the seat assembly. This asembly is shown in FIGURE 3. It consists of an O ring 88, upper steel back-up ring 84 and lower steel back-up ring 90 and the "Teflon" seat 80.

Where the seating area of the valve is small and the angle of the metering pin very slight, over-torquing will place stresses on the plastic seat far beyond the working limits of the plastic. With this new design the designer can readily give the plastic seat the necessary added area, at the same time adding the proper stress angle to the seat necessary to absorb any stress problem caused by over-torquing. This new design allows the designer to make a valve with any sized orifice and still stay well within the working range of the plastic stress points, regardless of the torquing problems.

FIGURE 1 illustrates the basic design of this new seat assembly. This figure illustrates how the plastic seat is rigidly held in place by steel. The plastic seat still retains its resiliency with a minimum amount of movement which makes an ideal valve seat. The high pressure stress on the plastic seat cannot distort it. The only movement caused by the high pressure is a very slight compression of the plastic which causes the plastic to move very slightly toward the metering pin.

Characterization of Flow

This is readily accomplished by shaping and positioning of the metering holes 20 in the barrel. The distance these holes are placed from the plastic determines the opening characteristic of the valve. These holes may be round, slotted, square, triangular, upright, or inverted triangle. The holes may also be positioned so that any number of them will open simultaneously or in any succession desired. This allows the designer to shape his flow curve to the exact shape which will most favorably fit the application for which the valve is to be used.

Operation of Spindle Seal

This new assembly insures a positive seal at all times from zero to 15,000 p.s.i. and higher.

It requires no lubrication, so is ideal for oxygen service. It has temperature compensation, and operates at a very low torque.

The cold flow of the "Teflon" is under complete control. The expansion and contraction of the "Teflon" due to temperature change is compensated for. Wear is also taken care of with this same compensation. The proper tension is maintained on the seal at all times. This tension is not affected by wear, and is automatically increased when the pressure rises.

When "Teflon" or similar plastic are used in the conventional manner as a stuffing box material it will soon develop leaks, that is if there are temperature changes present. This is due to the high expansion factor of the plastic. If the gland nut is turned down tight enough for the low temperatures, it will be much too tight when the temperature rises. As the plastic is substantially non-compressible, it must go somewhere when this expansion takes place. The tremendous pressure produced by this expansion causes the "Teflon" to extrude through the gland around the spindle in the form of a very thin flake. When the temperature goes down and this pressure recedes, the plastic contracts and the seal will leak. If there is little or no clearance this flaking will occur around the spindle and be retained, but the seal being damaged will leak at the lower temperature. This new assembly completely overcomes all this trouble.

The seal will hold any pressure. Should the pressure continue to rise far above the working pressure, the design is such that the pressure holding the "Teflon" tube 62 against the spindle 46 is increased in proportion to the rise in pressure. This holding pressure will continue to rise in this manner, keeping the seal leak proof even to the bursting point.

The function of the spring compression washer 70 is simply to keep a slight pressure on the live silicon rubber tube 66. This rubber in turn acts as a fluid and surrounds the low portion of the "Teflon" and keeps enough pressure on the "Teflon" to insure the seal not leaking at low pressures and vacuums. The conical counterbore of washer 71 insures a flow of rubber around the feathering-out lower edge of the "Teflon" taper tube. When higher pressures are imposed on the seal, they simply add to the pressure already applied by the compression washer. These higher pressures act on the rubber which in turn places just the right amount of pressure evenly against the "Teflon" seal. This arrangement makes a very low torque, leak-proof seal which has an exceptionally long life.

It is believed that it will be clearly apparent from the above description and the disclosure in the drawings that the invention comprehends a novel construction of a low torque high pressure fluid valve.

Having thus disclosed my invention, I claim:

1. A high pressure metering valve for fluids comprising a valve body formed with a cylindrical spindle opening including lower cylindrical end terminating in a bottom, a first passageway for fluid coaxial with said spindle opening and communicating with said bottom, a second passageway for fluid communicating with said lower end of said spindle opening above the bottom thereof, a valve disc having a circular bore defining an interior surface in said disc, said disc being composed of cold flowing plastic and said disc being fitted within said lower end of said spindle opening, metal enclosing means for said plastic valve disc engaging the entire exterior surface thereof at all times, a spindle barrel secured within said spindle opening, said spindle barrel having a lower cylindrical portion fitted within the lower end of said spindle opening, said lower cylindrical portion being formed with ports positioned above the lower end of said spindle barrel, said ports communicating between the interior of said spindle barrel and said second passageway for fluid, and a valve stem longitudinally movable within said spindle barrel and having a piston valve portion and a tapered metering point, said tapered metering point being adapted to sealingly engage the interior surface of said valve disc, said piston valve portion of said valve stem obstructing said ports to permit slow metered passage of fluid through said valve while said ports are obstructed and said ports being positioned sufficiently above the lower end of said spindle barrel so that said metering point is well away from the cold flowing plastic of said valve disc before said piston valve portion is moved sufficiently to start opening said ports.

2. A high pressure metering valve as recited in claim 1 in which said spindle opening includes an upper cylindrical threaded portion of greater diameter than the lower cylindrical end of said spindle opening and said spindle barrel is threadedly secured to the said threaded portion of said spindle opening.

3. A high pressure metering valve as recited in claim 1 in which said metal enclosing means for the exterior surface of said plastic valve disc consists of said valve body and a backing disc interposed between said valve disc and the lower end of said spindle barrel.

4. A high pressure metering valve as recited in claim 1 in which said metal enclosing means for the exterior surface of said plastic valve disc consists of said valve body and an annular recess in the lower end of said spindle barrel.

5. A high pressure metering valve as recited in claim 1 in which said metal enclosing means for the exterior surface of said plastic valve disc comprises said valve body, and a backing disc which is supported by the lower end of said spindle barrel.

6. A high pressure metering valve as recited in claim 1 in which the opening of said valve disc forms a tapered metering opening.

References Cited in the file of this patent

UNITED STATES PATENTS

| | | |
|---|---|---|
| 897,364 | Glauber | Sept. 1, 1908 |
| 1,739,864 | Schardein | Dec. 17, 1929 |
| 2,520,092 | Fredrickson | Aug. 22, 1950 |
| 2,692,750 | Davis | Oct. 26, 1954 |
| 2,765,185 | Mott | Oct. 2, 1956 |
| 2,800,140 | Ross | July 23, 1957 |
| 2,805,040 | Voss | Sept. 3, 1957 |
| 2,876,988 | Mornard | Mar. 10, 1959 |
| 2,917,271 | Banks | Dec. 15, 1959 |

FOREIGN PATENTS

| | | |
|---|---|---|
| 561,219 | Italy | Apr. 16, 1957 |
| 666,670 | France | of 1929 |